United States Patent

[11] 3,628,824

| [72] | Inventors | David Leuw<br>Haifa;<br>Meir Dror, Kiryat Bialik, both of Israel |
|---|---|---|
| [21] | Appl. No. | 847,130 |
| [22] | Filed | Aug. 4, 1969 |
| [45] | Patented | Dec. 21, 1971 |
| [73] | Assignee | The State of Israel |

[54] IMPLEMENT FOR GRASPING SMALL OBJECTS
5 Claims, 5 Drawing Figs.

[52] U.S. Cl. ................................................ 294/99,
81/43, 294/1
[51] Int. Cl. ................................................ B25b 9/00
[50] Field of Search ........................................ 294/1, 99,
86, 86 H, 15, 27, 27 H, 1 CA, 1–3, 31, 33, 99;
124/10; 81/43; 128/354, 346

[56] References Cited
UNITED STATES PATENTS

| 3,239,262 | 3/1966 | Rines et al. ................... | 294/99 |
| 855,949 | 6/1907 | Hoffman ....................... | 294/99 X |
| 1,594,792 | 8/1926 | Mortimer ...................... | 294/99 |

Primary Examiner—Evon C. Blunk
Assistant Examiner—Johnny D. Cherry
Attorney—Benjamin J. Barish ABSTRACT: An implement for grasping small objects comprising a pair of spaced manipulatable strips, a flat transverse wall joined to and extending across one end of the strips, and a pair of jaws formed on the outer face of the transverse wall, the latter being resilient, and the jaws being spaced from each other a distance slightly less than the dimensions of the object to be grasped but being movable sufficiently apart to permit reception of the object therebetween when the strips are pressed toward each other to flex the transverse wall.

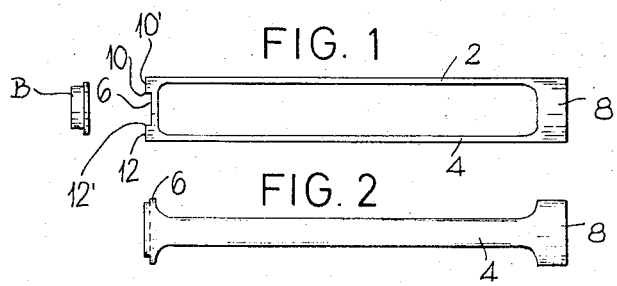
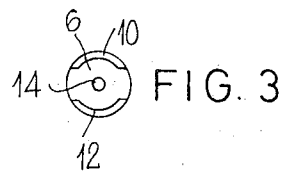
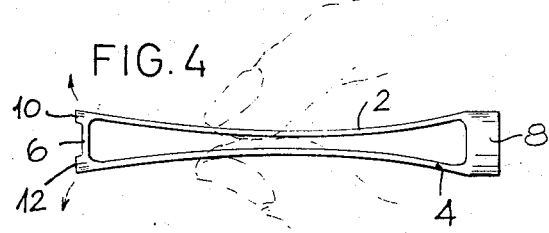
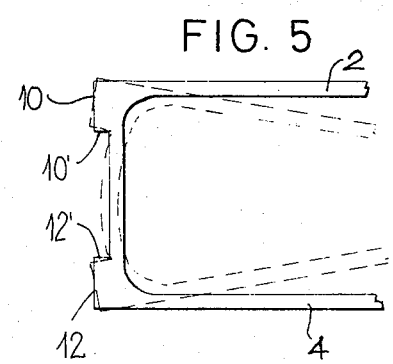
INVENTOR
DAVID LEUW
MEIR DROR
BY
ATTORNEY

IMPLEMENT FOR GRASPING SMALL OBJECTS

BACKGROUND OF THE INVENTION

1. Field of the Invention

The present invention relates to implements for grasping small objects such as small bearings.

2. Description of the Prior Art

Various types of implements are now used for grasping small objects such as bearings. One commonly used implement includes a chuck which is opened for insertion of the small object, and then closed to grasp it. This implement, however, tends to scratch or mar the object or to leave burrs or other extraneous particles on it, and it is therefore not always satisfactory, particularly when handling very small precision elements under clean room conditions. Other types of implements resemble conventional tweezers, but they also tend to mar and scratch the object, and moreover they do not hold it in a secure and/or convenient manner for handling of the object. Further, many of the known type of implements are complicated in construction and expensive to produce.

SUMMARY OF THE PRESENT INVENTION

According to the present invention there is provided an implement for grasping small objects which comprises a pair of spaced, longitudinally extending manipulatable elements, a flat transverse wall joined to and extending across one end of the manipulatable elements, and a pair of jaws fixed to the outer face of the transverse wall at opposite sides thereof. The transverse wall is resilient, and the jaws are spaced from each other a distance slightly less than the dimensions of the object to be grasped during the unflexed condition of the transverse wall, but are movable sufficiently apart to permit reception of the object therebetween the the manipulatable elements are moved toward each other to flex the transverse wall.

The manipulatable elements are preferably in the form of resilient strips and are joined together at their ends opposite to the transverse wall by a substantially rigid element, such as a rigid annular ring.

The described embodiment is particularly designed for grasping small circular bearings. In this embodiment, the transverse wall is circular in shape, and the jaws are arcuate and are disposed at the outer circumference of the wall at opposite sides thereof.

Further features and advantages of the invention will be apparent from the description below.

BRIEF DESCRIPTION OF THE DRAWINGS

The invention is herein described, by way of example only, with reference to the accompanying drawings, wherein:

FIG. 1 is a side elevational view of one form of implement constructed in accordance with the invention for grasping small bearings, the bearing also being illustrated;

FIG. 2 is a similar view as FIG. 1 but turned 90°;

FIG. 3 is an end view of the left-hand end of the implement of FIG. 1;

FIG. 4 illustrates the manner of using the implement of FIG. 1; and

FIG. 5 is a partial enlarged view helpful in explaining the operation of the implement of FIG. 1.

DESCRIPTION OF THE PREFERRED EMBODIMENT

The implement illustrated in the drawings comprises a pair of spaced, longitudinally extending manipulatable elements or strips 2, 4 joined at one end by a flat transverse wall 6, and joined at the opposite end by an annular ring 8. Strips 2 4 are made thin and arrow (see FIG. 2) so as to be flexible, and ring 8, although it may be of the same thickness, is substantially rigid because of its annular shape. Transverse wall 6 is also resilient, in that it tends to bow or flex outwardly when strips 2 and 4 are squeezed together.

The outer face of transverse wall 6 is formed with a pair of jaws 10, 12. These jaws are in the form of integral shoulders projecting outwardly from the outer face of wall 6. During the unflexed condition of the flat transverse wall 6, these jaws (i.e., their inner surfaces 10', 12') are substantially at right angles to the plane of the flat wall 6. Also, the jaws are spaced from each other a distance slightly less than the dimensions of the object to be grasped during the unflexed condition of wall 6, but upon flexing the wall, the jaws are movable apart a sufficient extent to permit reception of the object therebetween.

In the described embodiment, the object to be grasped is bearing B which is of circular shape. Accordingly, transverse wall 6 is of circular shape, and the two jaws 10, 12 are arcuate and are disposed along the outer circumference of the wall in opposed spaced relationship. A central opening 14 may be formed in the wall to increase its resiliency.

The operation of the illustrated device will be apparent from the foregoing description. In the normal condition of the implement, i.e., in the unflexed condition of strips 2, 4 and transverse wall 6, the jaws 10, 12 are spaced apart slightly less than the external dimensions of bearing B. When it is desired to grasp the bearing, strips 2, 4 are squeezed together as shown in FIG. 4. This causes wall 6 to be flexed or bowed outwardly, thereby causing the inner surfaces 10', 12' of jaws 10', 12' to move apart sufficiently so as to be able to receive bearing B between them. The implement is placed over the bearing with the bearing between the two jaws, and the flexible strips 2, 4 are then released. Wall 6 returns to its normal unflexed condition, whereby the bearing is securely held between the jaws 10, 12.

It has been found that making strips 2 and 4 flexible enhances the "feel" to the user when he uses it for grasping the object.

The implement thus holds the bearing and enables it to be handled in a convenient manner. When it is desired to release the bearing, it is only necessary to squeeze strips 2, 4 again, whereupon jaws 10, 12 will move apart sufficiently to permit the bearing to drop out of the implement.

Many modifications, variations and other applications of the illustrated embodiment will be apparent.

What is claimed is:

1. An implement for grasping small objects, comprising, a pair of spaced, longitudinally extending manipulatable elements, a flat transverse wall joined to and extending across said manipulatable elements at one end thereof, and a pair of jaws carried on the outer face of said flat transverse wall at opposite sides thereof, said flat transverse wall being resilient, said manipulatable elements being in the form of resilient strips and joined together at their ends opposite to said transverse wall by a substantially rigid element, said jaws being substantially at right angles to the plane of said flat transverse wall during the unflexed condition thereof and being movable apart to permit reception of the object therebetween when the manipulatable elements are moved toward each other to flex said flat transverse wall.

2. An implement as defined in claim 1, wherein said jaws are integrally formed on the outer face of said transverse wall.

3. An implement as defined in claim 1, wherein said transverse wall is formed with a central opening increasing the resiliency thereof.

4. An implement as defined in claim 1, wherein said substantially rigid element is an annular ring.

5. An implement as defined in claim 1, wherein said transverse resilient wall is circular in shape and said jaws are in the form of arcuate axial projections integrally formed on the outer circumference of said wall.

* * * * *